(12) United States Patent
Sakai

(10) Patent No.: US 8,798,020 B2
(45) Date of Patent: Aug. 5, 2014

(54) COMMUNICATION DEVICE, CONTROL METHOD OF COMMUNICATION DEVICE, AND PROGRAM

(75) Inventor: Tatsuhiko Sakai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 98 days.

(21) Appl. No.: 13/319,565

(22) PCT Filed: Apr. 22, 2010

(86) PCT No.: PCT/JP2010/002895
§ 371 (c)(1),
(2), (4) Date: Nov. 9, 2011

(87) PCT Pub. No.: WO2010/131424
PCT Pub. Date: Nov. 18, 2010

(65) Prior Publication Data
US 2012/0063327 A1      Mar. 15, 2012

(30) Foreign Application Priority Data

May 15, 2009   (JP) ................................ 2009-118973

(51) Int. Cl.
*H04W 4/00* (2009.01)

(52) U.S. Cl.
USPC ......................................................... 370/338

(58) Field of Classification Search
USPC .......................... 370/310, 312–313, 328–339;
455/426.1, 426.2, 11.1; 709/208–209
See application file for complete search history.

(56) References Cited

U.S. PATENT DOCUMENTS

| | | | |
|---|---|---|---|
| 6,574,452 B1 * | 6/2003 | Morvan et al. | 455/11.1 |
| 6,847,625 B2 * | 1/2005 | Heinonen et al. | 370/338 |
| 6,894,992 B1 * | 5/2005 | Morvan et al. | 370/329 |
| 7,212,513 B2 * | 5/2007 | Gassho et | 370/338 |
| 7,362,722 B2 | 4/2008 | Otsuka | |
| 8,270,414 B2 * | 9/2012 | Oi et al. | 370/400 |
| 2006/0221856 A1 | 10/2006 | Quiroz | |
| 2008/0089300 A1 | 4/2008 | Yee | |
| 2010/0008339 A1 * | 1/2010 | Huang | 370/338 |

FOREIGN PATENT DOCUMENTS

| | | |
|---|---|---|
| CN | 1494787 A | 5/2004 |
| CN | 1855865 A | 11/2006 |
| CN | 201004699 Y | 1/2008 |
| JP | 2000-082989 | 3/2000 |
| JP | 2003-152730 | 5/2003 |

(Continued)

OTHER PUBLICATIONS

Wi-Fi Certified(TM) for Wi-Fi Protected Setup: Easing the User Experience for Home and Small Office Wi-Fi(R) Networks, http://www.wi-fi.org/wp/wifi-protected-setup; Version 1.0h, Dec. 2006, 110 pages.

*Primary Examiner* — Frank Duong
(74) *Attorney, Agent, or Firm* — Canon USA, Inc. IP Division

(57) ABSTRACT

A communication procedure for providing or receiving communication parameters can be performed by an easy operation even between devices having both a base station function and a slave station function. A communication device of the present invention determines a role of a device when performing a predetermined communication procedure for providing or receiving communication parameters, and selects operating as a base station or operating as a slave station based on the determined role. The communication device selects based on the determined role operating as a providing device or operating as a receiving device.

27 Claims, 7 Drawing Sheets

(56) References Cited

FOREIGN PATENT DOCUMENTS

| JP | 2003-524941 | A | 8/2003 |
| JP | 2006-005844 | | 1/2006 |
| JP | 2008-047954 | | 2/2008 |
| JP | 2008-187348 | A | 8/2008 |
| WO | 2005/034434 | A | 4/2005 |

* cited by examiner

COMMUNICATION DEVICE, CONTROL METHOD OF COMMUNICATION DEVICE, AND PROGRAM

TECHNICAL FIELD

The present invention relates to a communication device, a control method of the communication device, and a program.

BACKGROUND ART

In recent years, devices having functions both as an access point (AP) of infrastructure communication of wireless local area network (LAN) compliant with IEEE802.11 series, and as a station (STA) which connects and communicates with the AP, have come on the market. Such a device can construct a network as an AP, and also can participate in a network constructed by other APs as an STA.

An example of communication device which can switch the role of the device (base device, slave device) is discussed in Japanese Patent Application Laid-Open No. 2006-005844 and Japanese Patent Application Laid-Open No. 2003-152730.

An example of communication device in which a function of a relay station (access point) and a function of a station are operated at the same time is discussed in U.S. Pat. No. 7,362,722 (Japanese Patent Application Laid-Open No. 2005-086350).

When AP and STA communicate with each other, there are many setting items which need to be set before use. For example, the setting items include communication parameters to perform wireless communication, such as a service set identifier (SSID) as a network identifier, an encryption method, an encryption key, an authentication method, and an authentication key. To set these communication parameters, automatic setting methods for simply setting communication parameters to a wireless communication device are devised by various manufacturers. In these automatic setting methods, communication parameters are automatically set by providing communication parameters from one device to another device using a procedure and a message predetermined between the devices to be connected to each other.

Non Patent Literature 1 discusses Wi-Fi protected setup (hereinafter, WPS), which is an industry standard of a communication parameter automatic setting method between AP and STA.

When performing wireless communication between the devices having both functions of the AP function and the STA function, the communication is possible when one device constructs a network as an AP and the other device connects to the network as an STA. When devices, which are in an initial state and operate neither as AP nor as STA, try to communicate with each other, the roles of the devices need to be determined, for example, a device which becomes AP is determined.

In this case, when user's convenience is considered, it is desired that the determination of the roles is automatically performed between the devices. However, a method in which the roles are automatically determined between the devices without requiring user's operation has not been established. Therefore, when the devices have both the AP function and the STA function, the automatic setting processing of communication parameters cannot be performed, so that there is a problem that the devices operating both as AP and as STA cannot easily communicate with each other.

CITATION LIST

Non Patent Literature

[NPL 1]
Wi-Fi CERTIFIED™ for Wi-Fi Protected Setup: Easing the User Experience for Home and Small Office Wi-Fi® Networks.

SUMMARY OF INVENTION

The present invention is directed to a communication method in which a communication procedure for providing or receiving communication parameters can be performed by an easy operation even between devices having both a base station function and a slave station function.

According to an aspect of the present invention, a communication method determines a role of a device when performing a predetermined communication procedure for providing or receiving communication parameters, selects operating as a base station or operating as a slave station based on the determined role, selects based on the determined role operating as a providing device or operating as a receiving device.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

DESCRIPTION OF EMBODIMENTS

Various exemplary embodiments, features, and aspects of the invention will be described in detail below with reference to the drawings.

Hereinafter, although an example which uses a wireless LAN system compliant with IEEE802.11 series will be described, a communication method is not limited to a wireless LAN compliant with IEEE802.11.

Figure 1A:
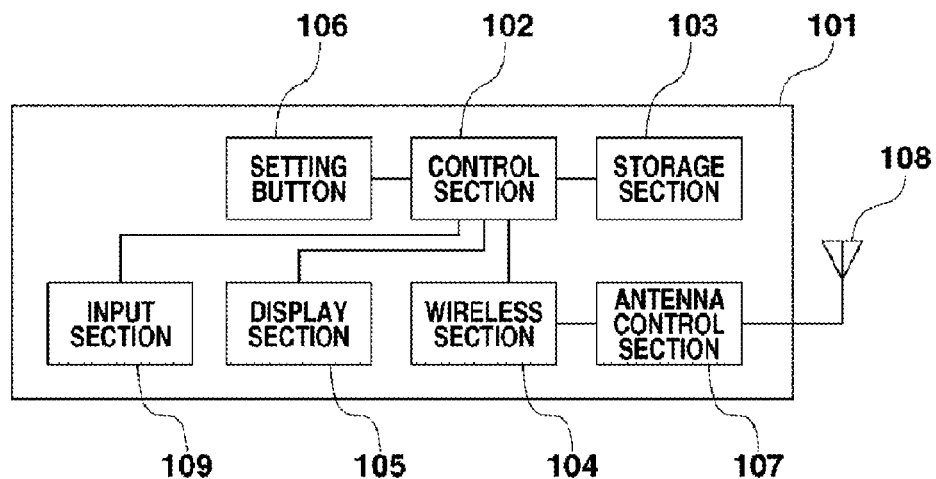
FIG. 1A is a block diagram illustrating a configuration of a device according to an exemplary embodiment of the present invention.

FIG. 1A is a hardware block diagram illustrating a configuration example of devices described below according to an exemplary embodiment to which the present invention can be applied. The device 101 is an entire device. A control section 102 controls the entire device by executing a control program stored in a storage section 103. The control section 102 performs a communication parameter setting control between the device and another device. A storage section 103 stores the control program executed by the control section 102 and various information such as a communication parameter. Various operations described below are performed when the control section 102 executes the control program stored in the storage section 103. A wireless section 104 is for performing wireless communication. A display section 105 displays various information and has a function of outputting visible information as a liquid crystal display (LCD) and a light-emitting diode (LED) and a function of outputting audio information as a speaker.

A setting button 106 is a button to provide a trigger to start communication parameter setting processing. When the control section 102 detects an operation of the setting button 106 by a user, the control section 102 performs processing described below. An antenna control section 107, and an antenna 108 are illustrated in FIG. 1A. An input section 109 is a section for a user to input various information.

Figure 1B:
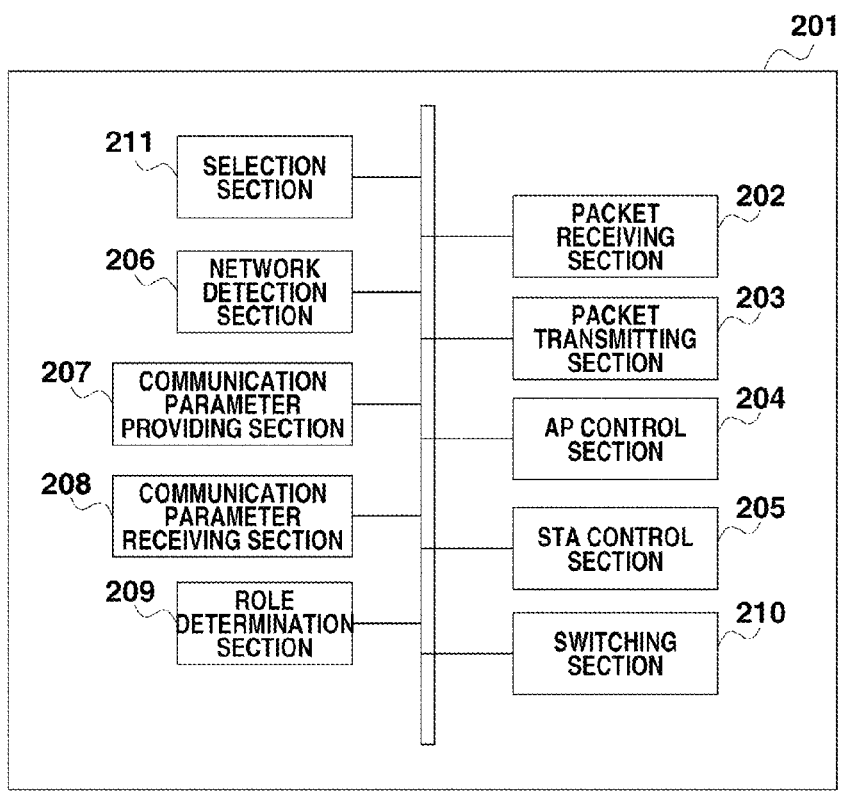
FIG. 1B is a block diagram illustrating a configuration of a device according to an exemplary embodiment of the present invention.

FIG. 1B is a block diagram illustrating an example of a configuration of software function blocks performed by the devices in the communication parameter setting processing described below. A device 201 is an entire device. A packet receiving section 202 is a section for receiving packets of various communication. Beacon (notification signal) is received by the packet receiving section 202. Also, a device search signal such as a probe request is received by the packet receiving section 202. The probe request can be treated as a network search signal for searching a desired network. A probe response which is a response signal to the probe request is also received by the packet receiving section 202.

A packet transmitting section 203 is a section for transmitting packets of various communication. Transmission of beacon is performed by the packet transmitting section 203. The probe request and the probe response which is a response signal to the probe request are also transmitted by the packet transmitting section 203. Various information (self-information) of a transmission source device is added to the device search signal and the response signal thereto. An AP control section is a section for controlling an access point (AP) communication function. An operation as an access point (AP) described below is performed by using the AP control section 204. The AP is a base station (base device, master station) which performs various controls of wireless network. The AP is a device which establishes a network by itself when performing communication and performs various controls in response to a connection request from a station (STA). The AP transmits a beacon periodically when performing communication, and when receiving a connection request signal transmitted from an STA, the AP transmits a connection request response signal to the STA to connect with the STA.

An STA control section 205 is a section for controlling an STA communication function. An operation as a station (STA) described below is performed by using the STA control section 205. The STA is a slave station (slave device, mobile device) in a wireless network, and connects to the AP when performing communication. When performing communication, the STA transmits a connection request signal to an AP, receives a connection request response signal from the AP to connect with the AP, and performs communication under the control of the AP. As described in a second exemplary embodiment, wireless LAN ad-hoc communication in which two STAs communicate with each other directly can be performed by using the STA control section 205.

A network detection section 206 is a section for detecting a network present in surrounding areas. A device can detect a network present in surrounding areas by receiving a beacon or a probe response from a device in surrounding areas via the packet receiving section 202. It is also possible to detect an AP, which is constructing a network, by using the network detection section 206. An AP detection operation described below is performed by using the network detection section 206. A communication parameter providing section 207 is a section for providing a communication parameter to a device on the other side of communication. Communication parameter automatic setting described below is provided by the communication parameter providing section 207. The communication parameter providing section 207 provides communication parameters necessary for performing wireless communication, such as an SSID as a network identifier, an encryption method, an encryption key, an authentication method, and an authentication key. A communication parameter receiving section 208 is a section for receiving a communication parameter from the device on the other side of communication. Communication parameter automatic setting described below is received by the communication parameter receiving section 208.

A role determination section 209 is a section for determining a device which manages network when performing communication between devices. Role determination processing described below is performed by the role determination section 209. By the role determination processing, either role of "management device" or "terminal device" is provided to each device. A device to which the role of management device is provided operates as an AP by using the AP control section 204, and provides communication parameters to the terminal by the parameter providing section 207. On the other hand, a device to which the role of the terminal device is provided operates as an STA by using the STA control section 205, and receives communication parameters from the AP by the parameter receiving section 208.

A switching section 210 is a section for switching between operating as an AP using the AP control section 204, and operating as an STA using the STA control section 205, and selects the switched operation. The switching section 210 performs a first switching according to a role determined by the role determination section 209, a second switching according to a detection result detected by the network detection section 206, and the like.

A selection section 211 is a section for selecting between operating as a providing device which provides a communication parameter using the communication parameter providing section 207, and operates as a receiving device using the communication parameter receiving section 208. The selection section 211 performs a selection according to the role determined by the role determination section 209.

Figure 2A:
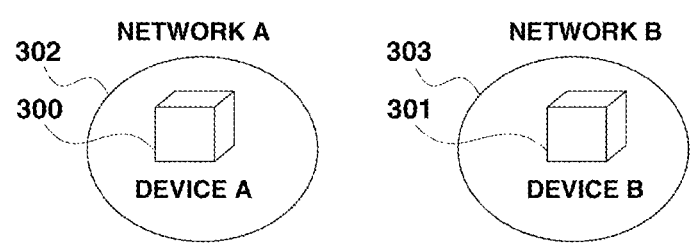
FIG. 2A is a network configuration diagram of an exemplary embodiment of the present invention.
Figure 2B:
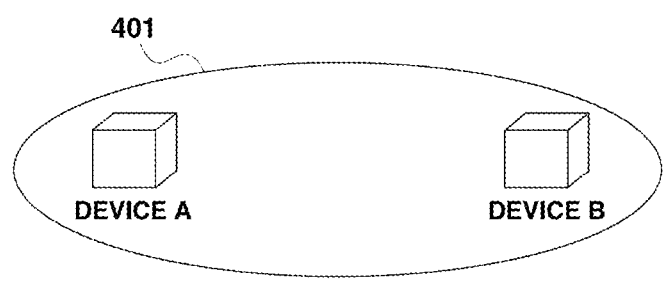
FIG. 2B is a network configuration diagram of an exemplary embodiment of the present invention.

FIGS. 2A and 2B are diagrams illustrating network constructions of a communication device-A 300 (hereinafter, device A) and a communication device-B 301 (hereinafter, device B). These devices have configurations illustrated in FIGS. 1A and 1B.

When the device A and the device B operate as an AP, the device A and the device B respectively establish a network-A 302 (hereinafter, network A) and a network-B 303 (hereinafter, network B) (FIG. 2A). After the device A and the device B detect each other, one of the devices participates in a network established by the other device, and the devices exchange messages for determining the management device. At this time, all communication parameters are not set, but some communication parameters by which the messages for determining the role can be exchanged are set. More specifically, a network identifier is stored in a signal (beacon, probe request, and probe response) used for device detection processing.

A device which tries to participate in the network sets a network identifier of the network in which the device tries to participate, and thereafter performs participation processing. The encryption method and the encryption key have not been set yet. The device which becomes the management device as a result of the exchange of the messages establishes a network 401 as an AP, and provides communication parameters to the STA by automatic setting of communication parameters (FIG. 2B).

The STA which has received the communication parameters participates in the network by using the received communication parameters. The communication parameter providing processing (receiving processing) is performed by, for example, a communication parameter automatic setting procedure such as Wi-Fi Protected Setup between devices. The communication parameter automatic setting procedure is a communication procedure by which the providing device provides communication parameters to the receiving device and the receiving device receives the communication parameters from the providing device. This procedure is performed by exchanging predetermined messages between the devices.

Figure 3:
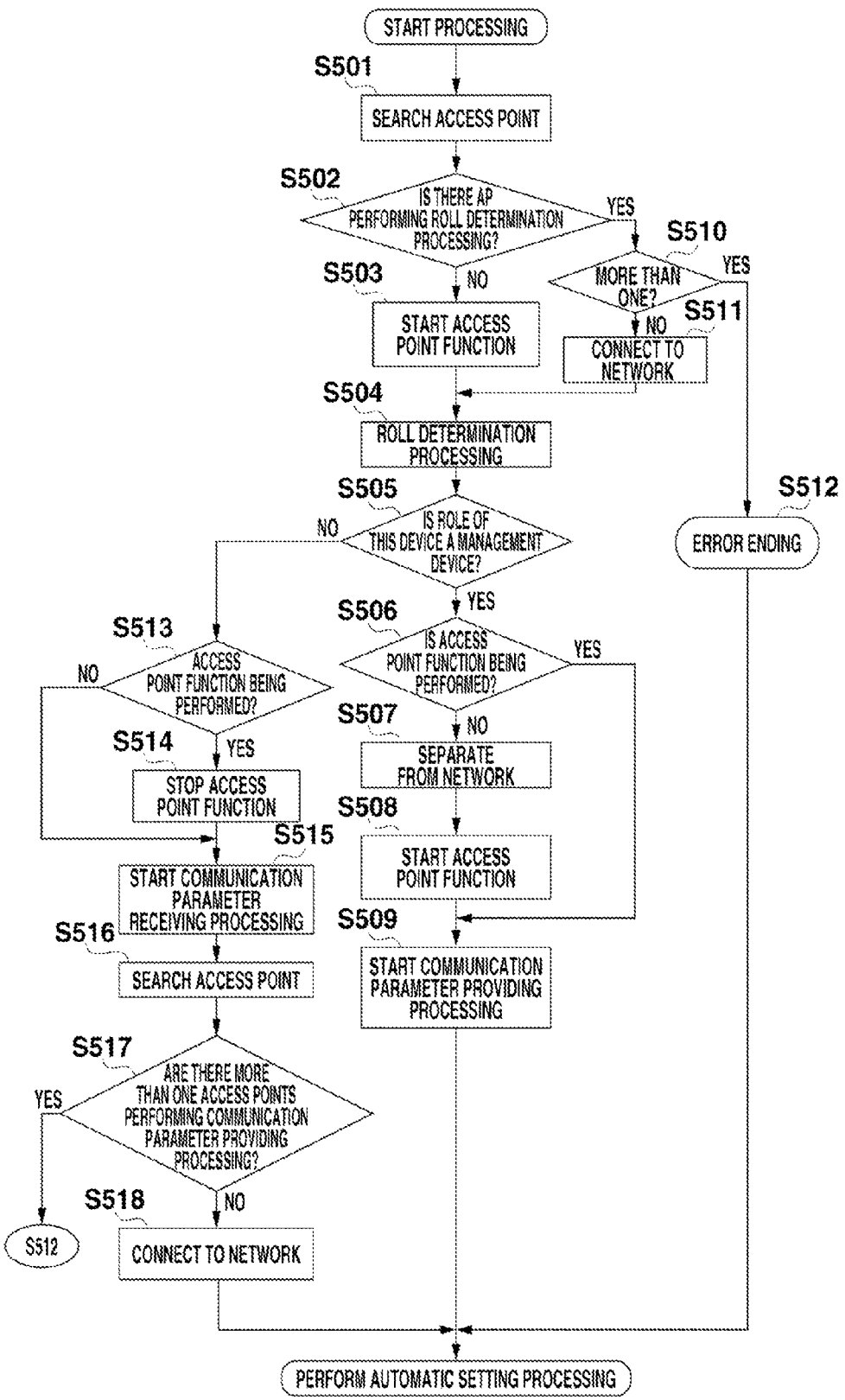
FIG. 3 is a flowchart illustrating a communication processing of a device A and a device B according to a first exemplary embodiment of the present invention.

FIG. 3 is a flowchart illustrating an example of an operation flow of communication processing performed between the device A and the device B when the setting button 106 is pressed. This operation is performed when the control section 102 reads the control program stored in the storage section 103 and controls the wireless section 104 or the like. Hereinafter, a control performed by both devices will be described along the flowchart.

In the device in which the setting button 106 is pressed, the control section 102 starts the role determination section 209. In step S501, the role determination section 209 performs processing to search an access point (AP) present in surrounding areas by using the network detection section 206. In step S502, the role determination section 209 checks information included in a received beacon or probe response, and checks whether there is an AP which is performing the roll determination processing.

In step S510, when there is at least one AP which is performing the roll determination processing, the role determination section 209 checks whether there is one AP or more than one APs which are performing the roll determination processing. In step S512, when more than one APs which are performing the roll determination processing are detected, an error notification informing a user of an error is displayed on the display section 105, and the role determination section 209 ends the processing due to an error.

In step S511, when there is one AP which is performing the roll determination processing, the role determination section 209 connects to the network constructed by the detected AP using the STA control section 205.

In step S503, when there is no AP which is performing the roll determination processing, the role determination section 209 starts an access point operation using the AP control section 204. When the AP control section 204 starts the access point operation, the AP control section 204 adds self-information indicating that the AP control section itself is performing the role determination processing, to a beacon and a probe response, and transmits the beacon and the probe response.

In step S504, the role determination section 209 exchanges arbitration messages with the device on the other side, and determines which device becomes the management device. As an example of the determination processing in step S504, it is possible to use a method of including information indicating a priority of the management device in the arbitration message and transmitting the arbitration message. In this case, by comparing the priority included in the arbitration message received from the device on the other side and the priority of the device itself, a device having a higher priority is determined to be the management device. The priority of the management device is determined based on information such as a device type of the device, a remaining battery level, manufacturer information, universally unique identifier (UUID), and media access control (MAC) address.

When the device itself is operating as an access point, a priority higher than a case where it is operating as a station, may be set. Also, the priority information may be set based on connectivity to other networks, such as whether the device itself can be connected to the Internet. Further, when the priority of the device on the other side and the priority of the device itself are the same, by comparing information unique to a device such as UUID and MAC address, a device which satisfies a predetermined condition may be determined to be the management device.

In step S505, after determining the role, the control section 102 checks whether the determined role of the device itself is the management device. In step S506, when the device itself is determined to be the management device, the control section 102 checks whether the device itself is operating as an AP. If operating as an AP, the processing proceeds to step S509. If not operating as an AP, the control section 102 separates from the network connected by the STA control section 205 in step S507. In step S508, after separating from the network, the control section 102 starts an access point operation by using the AP control section 204. In step S509, thereafter, the control section 102 starts processing to provide communication parameters to the receiving device using the communication parameter providing section 207. The communication parameter providing processing is performed by performing the communication parameter automatic setting procedure between the providing device and the receiving device.

If the device itself is determined to be the terminal device as a result of the role determination, the control section 102 checks whether the device itself is operating as an AP in step S513. If not operating as an AP, the processing proceeds to step S515. If operating as an AP, the control section 102 stops the access point operation in step S514. In step S515, after stopping the access point operation, the control section 102 operates as a receiving device using the communication parameter receiving section 208, and starts processing to receive the communication parameters from the providing device.

In step S516, after starting the processing, the control section 102 performs a search of an AP using the network detection section 206. As a result of the search, if more than one APs which are performing the communication parameter providing processing are detected in step S517, the processing proceeds to step S512, displays an error notification informing a user of an error on the display section 105, and ends the process due to an error. If there is one AP which is performing the communication parameter providing processing in step S517, the control section 102 connects to the AP in step S518, and, as a receiving device which receives the communication parameters from a providing device, the control section 102 performs a predetermined communication parameter automatic setting procedure with the AP.

Figure 4A:
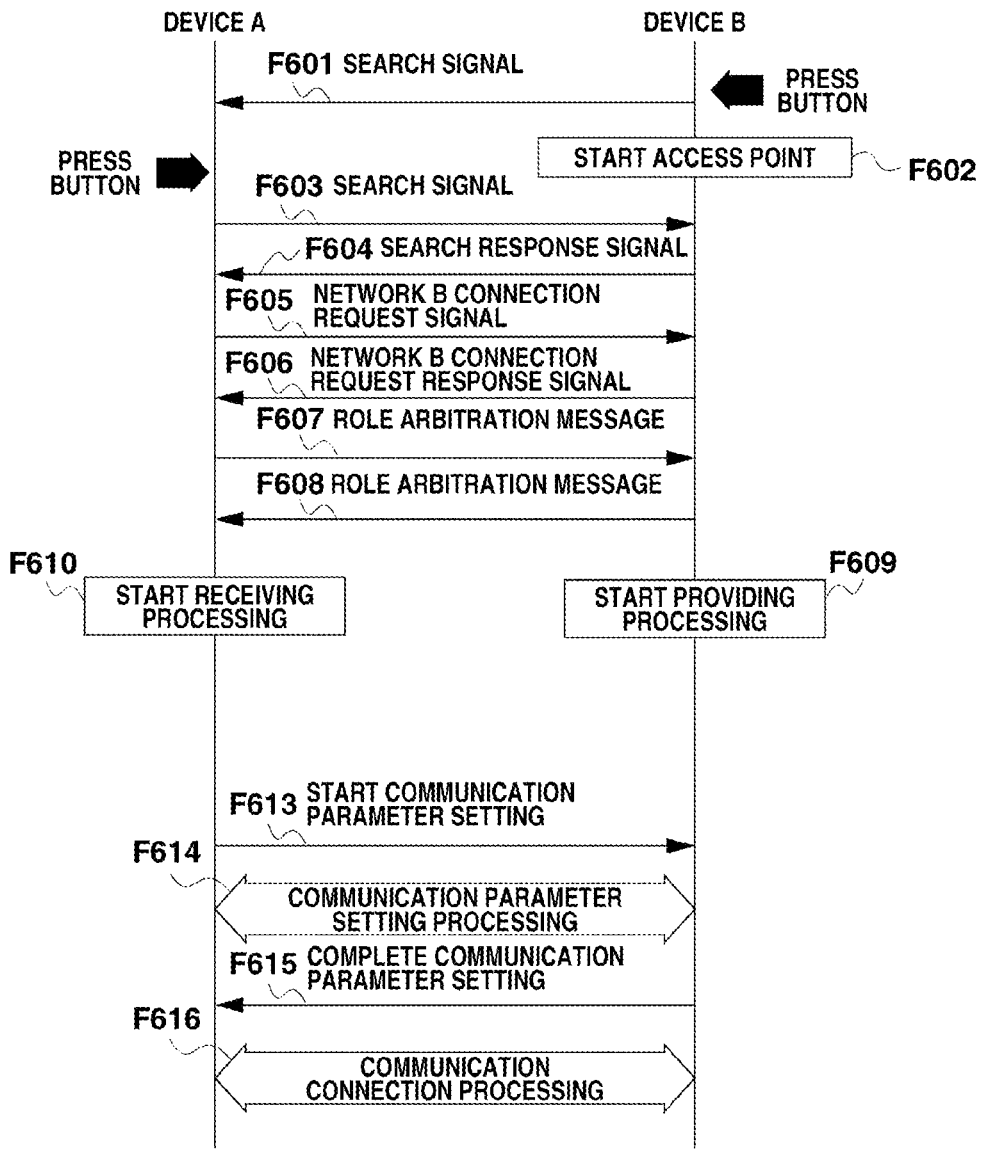
FIG. 4A is a sequence diagram illustrating an operation of the device A and the device B according to the first exemplary embodiment of the present invention.
Figure 4B:
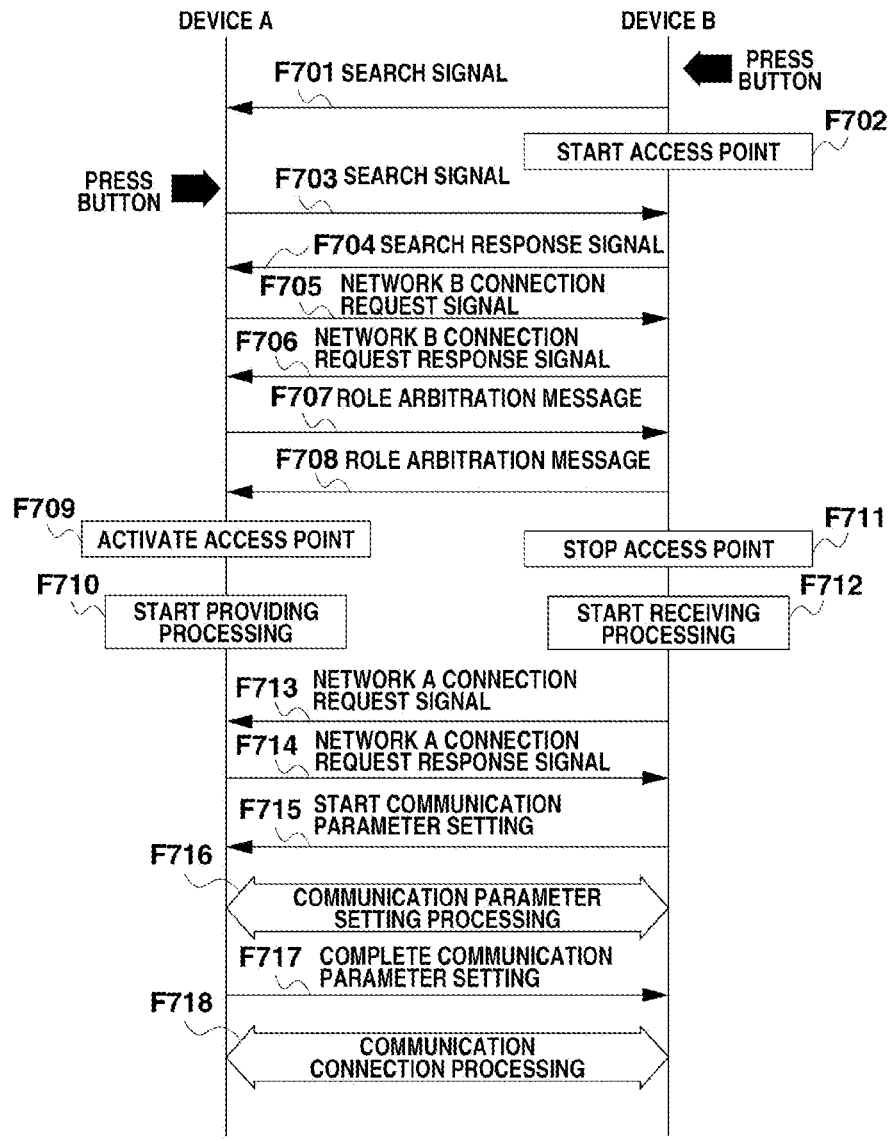
FIG. 4B is a sequence diagram illustrating an operation of the device A and the device B according to the first exemplary embodiment of the present invention.

FIGS. 4A and 4B are an example of a processing sequence in which the setting button 106 is pressed in the device A and the device B, and the communication parameter automatic setting processing is performed between the device A and the device B.

FIG. 4A is an example illustrating a processing sequence in which the setting button 106 is pressed in the device A and the device B, the roles are determined between the device A and the device B, and the device B becomes the management device to perform the communication parameter automatic setting processing.

When the setting button 106 of the device B is pressed, the device B performs the processing of FIG. 3. The device B transmits a device search signal (probe request), and checks whether there is an AP which is performing the roll determination processing in areas around the device B (F601). In this case, since there is no AP which is performing the roll determination processing in areas around the device B, the device B starts the access point operation to construct a network B (F602).

Thereafter, when the setting button 106 of the device A is pressed, the device A performs the processing of FIG. 3. The device A transmits a device search signal, and checks whether there is an AP which is performing the roll determination processing in areas around the device A (F603). The device search signal, which is an AP performing the roll determination processing, transmits a device search response signal (probe response) responding to the device search signal transmitted from the device A (F604). The device A receives the device search response signal from the device B, and recognizes that the device B is an AP which is performing the roil determination processing by checking the additional information in the signal. After recognizing that, the device A transmits a connection request signal to the device B, which is an AP performing the roll determination processing (F605).

The device B returns a connection request response signal indicating connection permission to the device A (F606). When the device A receives the connection request response signal from the device B, the device A connects to the device B and exchanges role arbitration messages to determine the management device (F607, F608). Each device refers to the other device's priority information included in the role arbitration message, and determines the management device by comparing the priority information with priority information of its own. In this case, it is assumed that the device B becomes the management device.

After determining the role, the device B starts the communication parameter providing processing (F609). On the other hand, the device A starts the communication parameter receiving processing (F610). Since the device A has already connected to the device B, the device A transmits a message indicating a start of the communication parameter setting to the device B (F613). Then, the communication parameter setting processing is performed by exchanging protocol messages for the automatic setting procedure between the device A which is a receiving device and the device B which is a providing device (F614). As a result, communication parameters are transmitted from the device B to the device A, and the device B transmits a message indicating the completion of the communication parameter setting to the device A (F615).

In this way, the communication parameter setting processing is completed. The device A sets the communication parameters (a network identifier (SSID), an encryption method, an encryption key, an authentication method, and an authentication key) received from the device B, and performs the communication connection processing again on the device B (F616). The communication protocol processing of the communication parameter setting processing can be realized by using communication protocol processing specified by industry standard communication parameter setting processing as discussed in Non Patent Literature 1.

Next, a case in which a device operating as an STA during the role determination processing becomes the management device and provides communication parameters will be described.

FIG. 4B is an example of a processing sequence in which the setting button 106 is pressed in the device A and the device B, the roles are determined between the device A and the device B, and the device A becomes the management device to perform the communication parameter automatic setting processing.

When the setting button 106 of the device B is pressed, the device B performs the processing of FIG. 3. The device B transmits the device search signal, and checks whether there is an AP which is performing the roll determination processing in areas around the device B (F701). In this case, since there is no AP which is performing the roll determination processing in areas around the device B, the device B starts the access point operation to construct a network B (F702).

Thereafter, when the setting button 106 of the device A is pressed, the device A performs the processing of FIG. 3. The device A transmits a device search signal (probe request), and checks whether there is an AP which is performing the roll determination processing in areas around the device A (F703). The device B, which is an AP performing the roll determination processing, transmits a device search response signal (probe response) responding to the device search signal transmitted from the device A (F704).

The device A receives the device search response signal from the device B, and recognizes that the device B is an AP which is performing the roll determination processing by checking the additional information in the signal. After recognizing that, the device A connects to the device B (F705, F706), and exchanges role arbitration messages to determine the management device (F707, F708). Each device compares the other devices priority information included in the role arbitration message with the priority information of its own, and determines the management device. In this case, it is assumed that the device A becomes the management device.

After determining the role, the device A starts the access point operation and constructs a network A (F709). After starting the access point operation, the device A starts the communication parameter providing processing (F710). On the other hand, the device B stops the access point operation (F711), and starts the communication parameter receiving processing (F712). The device B transmits a connection request signal to the device A which is the management device and the AP (F713). The device A returns a connection request response signal indicating connection permission to the device B (F714).

When the device B receives the connection request response signal from the device A, the device B connects to the device A and transmits a message indicating a start of the communication parameter setting (F715), and the communication parameter setting processing is performed between the device B which is the receiving device and the device A which is the providing device (F716). As a result, communication parameters are transmitted from the device A to the device B, and the device A transmits a message indicating the completion of the communication parameter setting to the device B (F717). In this way, the communication parameter setting processing is completed. The device B sets the communication parameters (i.e., a network identifier (SSID), an encryption method, an encryption key, an authentication method, and an authentication key) received from the device A, and performs the communication connection processing again to the device A (F718).

As described above, even a device having both functions of a base station and a slave station can determine a device that operates as a base station and a device that operates as a slave station. The device can also determine a device that operates as a communication parameter providing device and a device that operates as a communication parameter receiving device. Therefore, even when using a device having both functions of a base station and a slave station, if a user performs an operation such as pressing the setting button 106, the communication parameter setting processing can be performed between devices. Further, by performing the communication parameter setting processing, setting shared communication parameters, and performing authentication processing between devices, it is possible to perform encrypted wireless communication.

As a second exemplary embodiment, a case in which the role determination processing is performed by wireless LAN ad-hoc communication will be described. The ad-hoc communication is wireless communication performed directly between stations without using an access point. The device configuration is the same as that in FIGS. 1A and 1B.

Figure 5:
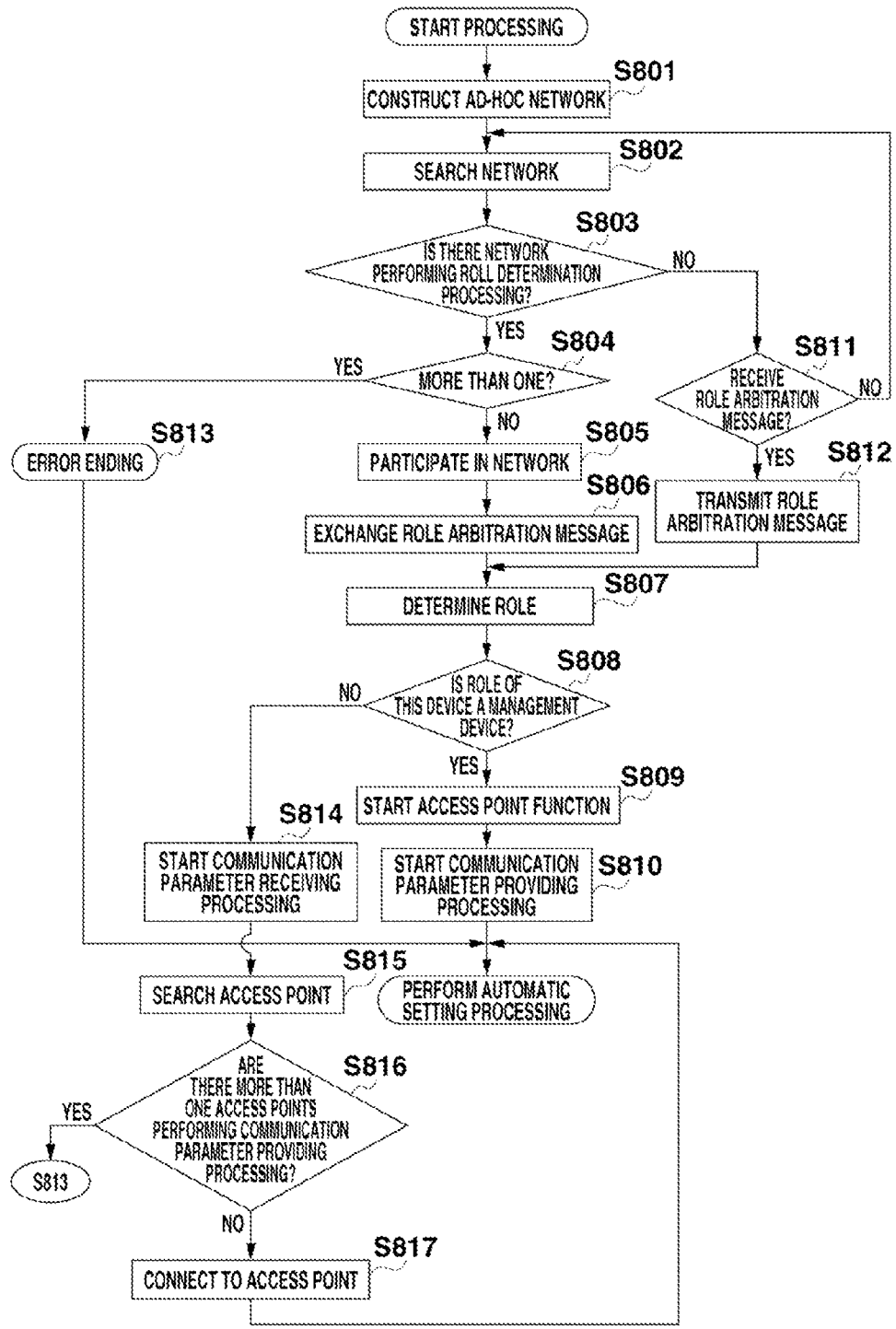
FIG. 5 is a flowchart illustrating a communication processing of the device A and the device B according to a second exemplary embodiment of the present invention.

FIG. 5 is a flowchart illustrating an example of an operation flow of communication processing performed between the device A and the device B when the setting button 106 is pressed. This operation is performed when the control section 102 reads the control program stored in the storage section 103 and controls the wireless section 104 or the like. Hereinafter, a control performed by both devices will be described along the flowchart.

In the device in which the setting button 106 is pressed, the control section 102 starts the role determination section 209. In step S801, the device constructs an ad-hoc network by using the STA control section 205. When the STA control section 205 constructs the ad-hoc network, the STA control section 205 adds self-information indicating that the STA control section itself is performing the role determination processing, to a beacon and a probe response.

After constructing the ad-hoc network, in step S802, the role determination section 209 performs processing to search an ad-hoc network present in surrounding areas by using the network detection section 206. In step S803, the role determination section 209 checks information included in a received beacon or a probe response, and checks whether there is an ad-hoc network which is performing the roll determination processing. In step S804, when there is at least one ad-hoc network which is performing the roll determination processing, the role determination section 209 checks whether there is one ad-hoc network or more than one ad-hoc networks which are performing the roll determination processing.

In step S813, when there are more than one ad-hoc networks which are performing the roll determination processing, an error notification informing a user of an error is displayed on the display section 105, and the processing ends due to an error. In step S805, when there is one ad-hoc network which is performing the roll determination processing, the role determination section 209 participates in the ad-hoc network by using the STA control section 205. When it participates in the network, the role determination section 209 stops the ad-hoc network constructed in step S801. After participating in the ad-hoc network, the role determination section 209 exchanges arbitration messages with the device on the other side in step S806, and determines which device becomes the management device in step S807.

In step S811, when there is no ad-hoc network which is performing the roll determination processing, the role determination section 209 waits for an role arbitration message transmitted from another device on the ad-hoc network constructed by the role determination section 209 itself. In step S802, when the role determination section 209 does not receive an role arbitration message in step S811, the role determination section 209 searches an ad-hoc network present in surrounding areas by using the network detection section 206 again.

When receiving a role arbitration message in step S811, the role determination section 209 transmits a role arbitration message to the transmission source device of the received role arbitration message in step S812, and determines which device becomes the management device in step S807. As an example of the determination processing, it is possible to use a method of including priority information of the management device in the arbitration message and transmitting the arbitration message. In this case, by comparing the priority included in the arbitration message received from the device on the other side and the priority of the device itself, a device having a higher priority is determined to be the management device.

The priority of the management device is determined based on information such as a device type including a printer, a camera, and the like, service information included in the device itself, manufacturer information, UUID, and MAC address. The priority information may also be set based on a remaining battery level. Also, the priority information may be set based on connectivity to other networks, such as whether the device itself can be connected to the Internet. When the priority of the device on the other side and the priority of the device itself are the same, the management device may be determined based on device unique information such as UUID and MAC address.

After determining the role, in step 808, the control section 102 checks whether the determined role of itself is the management device. In step S809, when the control section 102 determines itself to be the management device, the control section 102 starts an access point operation by using the AP control section 204. Thereafter, in step S810, the control section 102 starts processing to provide communication parameters to the receiving device by using the communication parameter providing section 207. When the receiving device is connected, as a providing device, the control section 102 performs a predetermined communication parameter automatic setting procedure with the receiving device, and performs the communication parameter providing processing.

After the check in step S808, when the control section 102 determines itself to be the terminal device, the control section 102 starts processing to receive the communication parameters from the providing device using the communication parameter receiving section 208 in step S814. Then, in step S815, the control section 102 searches an access point by using the network detection section 206. As a result of the search, in step 816, when more than one APs which are performing the communication parameter providing processing are detected, the processing proceeds to step S813, displays an error notification informing a user of an error on the display section 105, and ends the process due to an error.

When there is one AP which is performing the communication parameter providing processing in step S816, the control section 102 connects to the AP in step S817, and, as a receiving device which receives the communication parameters from a providing device, the control section 102 performs a predetermined communication parameter automatic setting procedure together with the AP which is the providing device.

Figure 6:
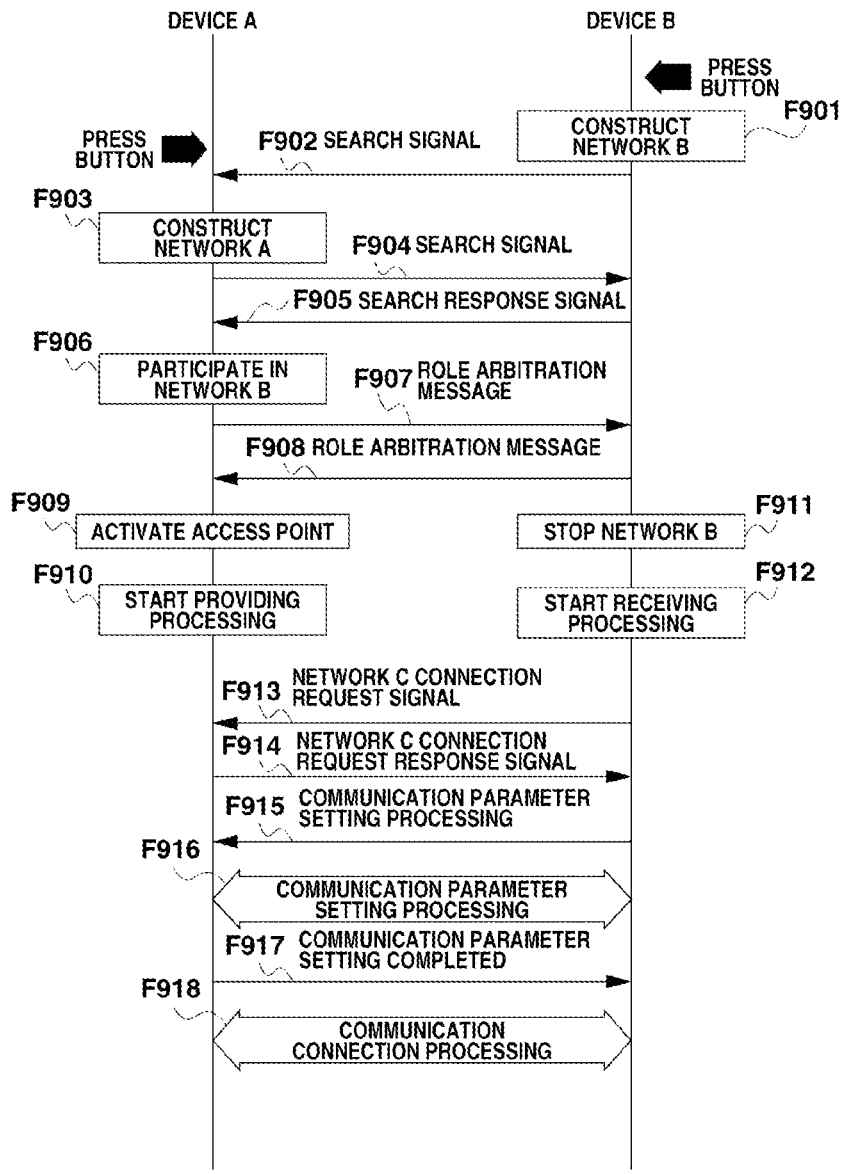
FIG. 6 is a sequence diagram illustrating an operation of the device A and the device B according to the second exemplary embodiment of the present invention.

FIG. 6 is an example illustrating a processing sequence in which the setting button 106 is pressed in the device A and the device B, the roles are determined between the device A and the device B, and thereafter the device A becomes the management device to perform the communication parameter automatic setting processing.

When the setting button 106 of the device B is pressed, the device B performs the processing of FIG. 5. The device B constructs an ad-hoc network B (F901), transmits a device search signal (probe request) (F902), searches a device which is performing the roll determination processing in surrounding areas, and searches an ad-hoc network in surrounding areas.

When the setting button 106 of the device A is pressed, the device A performs the processing of FIG. 5. The device A constructs an ad-hoc network A (F903), transmits a device search signal (F904), searches a device which is performing the roll determination processing in surrounding areas, and searches an ad-hoc network in surrounding areas. The device B transmits a device search response signal (probe response) responding to the device search signal transmitted from the device A (F905). The device A receives the device search response signal from the device B, and recognizes that the device B is performing the roll determination processing by checking the additional information in the signal.

After recognizing that, the device A stops the network A and participates in the network B (F906), and then transmits a role arbitration message to determine the management device, to the device B (F907). The device B, which receives the role arbitration message from the device A, transmits a role arbitration message to the device A (F908). Each device refers to the other device's priority information included in the role arbitration message, and determines the management device. In this case, it is assumed that the device A becomes the management device.

After determining the role, the device A starts the access point operation and constructs a network C (F909). After constructing the network, the device A starts the communication parameter providing processing (F910). On the other hand, the device B stops the network B (F911), and starts the communication parameter receiving processing (F912). The device B searches a network in surrounding areas, searches an AP which is performing the communication parameter providing processing, and detects the device A. The device B transmits a connection request signal to the device A to request a connection (F913).

When the device A receives the connection request signal from the device B, the device A returns a connection request response signal indicating connection permission to the device B (F914). When receiving the response signal, the device B connects to the device A, transmits a message indicating a start of the communication parameter setting to the device A (F915), and requests to start the communication parameter automatic setting processing. Then, the communication parameter setting processing is performed between the device B which is the receiving device and the device A which is the providing device (F916). As a result, communication parameters are transmitted from the device A to the device B, and the device A transmits a message indicating the completion of the communication parameter setting to the device B (F917). In this way, the communication parameter setting processing is completed.

The device B sets the communication parameters (i.e., a network identifier (SSID), an encryption method, an encryption key, an authentication method, and an authentication key) received from the device A, and performs the communication connection processing again on the device A (F918).

As described above, even a device having both functions of a base station and a slave station can determine a device that operates as a providing device of communication parameters and a device that operates as a receiving device of communication parameters. A device determined to be the providing device can operate as the base station, and perform the communication parameter automatic setting processing. Therefore, even when using a device having both functions of a base station and a slave station, if a user performs an operation such as pressing the setting button 106, the communication parameter setting processing can be performed between devices. Further, by performing the communication parameter setting processing, setting shared communication parameters, and performing authentication processing between devices, it is possible to perform encrypted wireless communication.

The exemplary embodiments of the present invention have been described above. However, the exemplary embodiments are only examples for description of the present invention, and the scope of the present invention is not intended to be limited to the exemplary embodiments. The exemplary embodiments can be variously modified without departing from the scope of the present invention.

The above description is made using an example of wireless LAN compliant with IEEE802.11. However, the present invention may be implemented in other wireless media such as wireless universal serial bus (USB), MBOA, Bluetooth (registered trademark), ultra wideband (UWB), and ZigBee. Also, the present invention may be implemented in wired communication media such as wired LAN. Here, the MBOA is an abbreviation of Multi Band OFDM Alliance. The UWB includes wireless USB, wireless 1394, WINET, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-118973 filed May 15, 2009, which is hereby incorporated by reference herein in its entirety.

The invention claimed is:

1. A communication device comprising:
 a determination unit configured to determine whether a role of the communication device is a first role or a second role based on a comparison of first information of the communication device with second information received from another communication device;
 a base station unit configured to operate as a base station;
 a station unit configured to operate as a slave station which is connected to a base station;
 a providing unit configured to operate as a providing device that provides a communication parameter; and
 a receiving unit configured to operate as a receiving device that receives a communication parameter from a providing device,
 wherein the communication device is configured to operate as a base station and a providing device of a communication parameter in a case where it is determined that the role of the communication device is the first role, and the communication device is configured to operate as a slave station and a receiving device of a communication parameter in a case where it is determined that the role of the communication device is the second role.

2. The communication device according to claim 1, wherein, in a case that the communication device operates as a base station, the communication device forms a wireless network, and, in a case that the communication device operates as a station, the communication device joins a wireless network formed by a base station.

3. The communication device according to claim 1, further comprising:
a search unit configured to search a base station that is performing role determination processing; and
a selection unit configured to operating as the base station using the base station unit, or operating as the slave station using the slave station unit based on a result of a search by the search unit.

4. The communication device according to claim 3, wherein, when no base station that is performing the role determination processing is present as a result of the search by the search unit, the selection unit selects the operation as the base station using the base station unit, and
the determination unit performs communication to determine the role in a network constructed as the base station.

5. The communication device according to claim 3, wherein, when the selection unit selects the operation as the slave station using the slave station unit, the communication device connects to a network constructed by a base station detected as a result of the search by the search unit, and the determination unit performs communication to determine the role in the network.

6. The communication device according to claim 1, further comprising a search unit configured to search a device that is performing a predetermined communication procedure for providing or receiving a communication parameter; and
a notification unit configured to notify an error when more than one device that is performing the predetermined communication procedure is detected as a result of the search by the search unit.

7. The communication device according to claim 1, wherein the second values are received from the other apparatus without using a base station.

8. The communication device according to claim 1, wherein the second values are received by wireless communication compliant with IEEE802.11 series.

9. The communication device according to claim 1, wherein the communication parameter to be provided by the providing unit and the communication parameter to be received by the receiving unit include at least one of a Service Set Identifier, an encryption method, an encryption key, an authentication method and an authentication key.

10. The communication device according to claim 1, wherein the communication parameter to be provided by the providing unit and the communication parameter to be received by the receiving unit are information necessary for accessing a wireless network formed by a wireless access point.

11. The communication device according to claim 1, wherein the first information indicates a priority, wherein the second information indicates a priority, and wherein the determination unit is configured to determine that a role of the communication device is the first role in a case where the priority indicated by the first information is higher than the priority indicated by the second information, and to determine that the role of the communication device is the second role in a case where the priority indicated by the first information lower than the priority indicated by the second information.

12. The communication device according to claim 11, wherein the determination unit is configured to determine that a role of the communication device is the first role based on third information different from the first information and the second information in a case that the priority indicated by the first information is equal to the priority indicated by the second information 13. The communication device according to claim 12 wherein the third information is information on the communication device, and wherein the determination unit is configured to determine that a role of the communication device is the first role in a case where the third information satisfies a predetermined condition, and to determine that a role of the communication device is the second role in a case where the third information does not satisfy the predetermined condition.

14. The communication device according to claim 1, wherein the providing unit is configured to provide a communication parameter by Wi-Fi Protected Setup, and wherein the receiving unit is configured to receive a communication parameter by Wi-Fi Protected Setup.

15. The communication device according to claim 1, wherein, in a case that the communication device operates as a base station, the communication device sends a beacon, and, in a case that the communication device operates as a station, the communication device does not send a beacon.

16. A control method performed by a communications device, the control method comprising:
determining whether a role of the communication device is a first role or a second role based on a comparison of first information of the communication device with second information received from another communication device,
wherein the communication device is configured to operate as a base station and a providing device of a communication parameter in a case where it is determined that the role of the communication device is the first role, and the communication device is configured to operate as a slave station and a receiving device of a communication parameter in a case where it is determined that the role of the communication device is the second role.

17. The method according to claim 16, wherein the determining determines the role of the communication device based on information included in a message exchanged with another communication device.
wherein the communication device is configured to operate as a base station and a providing device of a communication parameter in a case where it is determined that the role of the communication device is the first role, and the communication device is configured to operate as a slave station and a receiving device of a communication parameter in a case where it is determined that the role of the communication device is the second role.

18. The method according to claim 17, further comprising:
searching a base station that is performing role determination processing; and
operating as a base station, or operating as a station based on a result of the searching.

19. The method according to claim 17, wherein, when no base station that is performing the role determination processing is present, selecting the operation as a base station, and
performing communication to determine the role in a network constructed as a base station.

20. The method according to claim 17, further comprising notifying an error when more than one base station that are performing the role determination processing.

21. The method according to claim 16, wherein the determining determines the role of the communication device based on information included in a message exchanged with another communication device without using a base station.

22. A computer readable storage medium storing a computer-executable program of instructions for causing a computer to perform the control method comprising:
   determining whether a role of the communication device is a first role or a second role based on a comparison of first information of the communication device awith second information received from another communication device, with second information received from another communication device, 23. The computer readable storage medium according to claim 22, wherein the determining determines the role of the communication device based on information included in a message exchanged with another communication device.

24. The computer readable storage medium according to claim 23, further comprising:
   searching a base station that is performing role determination processing; and
   operating as thea base station or operating as the, slave station based on a result of the searching.

25. The computer readable storage medium according to claim 23, wherein, when no base station that is performing the role determination
   processing is present, selecting the operation as a base station, and performing communication to determine the role in a network constructed as thea base station.

26. The computer readable storage medium according to claim 23, further comprising notifying an error when more than one base station that are performing the role determination processing.

27. The computer readable storage medium according to claim 22, wherein the determining determines the role of the communication device based on information included in a message exchanged with another communication device without using a base station.

* * * * *